United States Patent [19]

Katsumata

[11] 4,373,179
[45] Feb. 8, 1983

[54] DYNAMIC ADDRESS TRANSLATION SYSTEM

[75] Inventor: Yutaka Katsumata, Inagi, Japan

[73] Assignee: Fujitsu Limited, Kawasaki, Japan

[21] Appl. No.: 919,173

[22] Filed: Jun. 26, 1978

[51] Int. Cl.³ ............................................... G06F 3/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,588,829 | 6/1971 | Boland et al. | 364/200 |
| 3,675,215 | 7/1972 | Arnold | 364/200 |
| 3,735,360 | 5/1973 | Anderson et al. | 364/200 |
| 3,742,458 | 6/1973 | Inoue et al. | 364/200 |
| 3,764,742 | 10/1973 | Abbott et al. | 364/200 |
| 3,898,623 | 8/1975 | Cormier | 364/200 |
| 3,902,163 | 8/1975 | Amdahl | 364/200 |
| 3,993,981 | 11/1976 | Cassarino et al. | 364/200 |
| 4,004,278 | 1/1977 | Nagashima | 364/200 |
| 4,017,840 | 4/1977 | Schild | 364/200 |
| 4,042,911 | 8/1977 | Bourke et al. | 364/200 |
| 4,056,844 | 11/1977 | Izumi | 364/200 |
| 4,059,850 | 11/1977 | Van Eck | 364/200 |
| 4,092,713 | 5/1978 | Scheuneman | 364/200 |
| 4,155,119 | 5/1979 | DeWard et al. | 364/200 |
| 4,181,936 | 1/1980 | Kober | 364/200 |

Primary Examiner—James D. Thomas
Assistant Examiner—David Y. Eng
Attorney, Agent, or Firm—Staas & Halsey

[57] ABSTRACT

A dynamic address translation system for use in a channel or sub-system adapter, wherein the main memory of a system is used in common with a central processing unit.

The system provides registers for storing a copy of an entry within the address translation table in the main memory and a bit which indicates the validity of such a copy, and when the central processing unit has issued an instruction for updating the entry within said address translation table or an instruction to alter said entry, the bit which indicates the validity of the contents of said register, is changed so as to indicate invalidity of the associated register contents. It is unnecessary in this system to fix the page in the main memory prior to execution of channel programs.

4 Claims, 4 Drawing Figures

DYNAMIC ADDRESS TRANSLATION SYSTEM

BACKGROUND OF THE INVENTION

1. Field of the Invention

The present invention relates to a dynamic address translation system, particularly to a dynamic address translation system in a channel or sub-system adapter in which the main memory is used in common with the central processing unit.

2. Description of Prior Art

In channel dynamic address translation systems in existing data processing systems, page fixing processing is conducted prior to the accessing of the main memory by the channels. In order to allow the access to this fixed page by the channels, the channel invalid bit is made OFF and thereafter the SIO instruction is issued for allowing access by the channels. These page fixing processes and the channel invalid bit operation are controlled by the operating system. However, this system has problems in that the overhead for searching the page to be fixed is applied also to any input/output devices to be connected to channels prior to the execution of channel programs, and the number of pages being fixed increases while starting a number of input/output devices, thereby causing the real memory to run short.

Moreover, in channel dynamic address translation systems in existing data processing systems, access protection for the main memory has been performed by comparing the storage key in every physical page within the main memory and the channel key to be transferred to channels while the SIO instruction is issued. In the virtual memory system, the access protection should naturally be performed in a unit of logical data. However, this system has problems in that the logical access protection data should be mapped to the physical access protection mechanism, causing an archtectural illogicality in that the channel must recognize the logical addresses for address and the physical keys for access protection. Furthermore, the overhead of mapping is also applied.

SUMMARY OF THE INVENTION

It is an object of this invention to realize a dynamic address translation system for which page fixing must be done previously in the channel or sub-system adapter for such input/output device or sub-system and which is allowed to interrupt during data transfer.

It is another object of this invention to realize such an architecture that page fixing is totally performed within the software. Namely, it is not necessary for hardware to fix the page in the input/output device requiring page fixing, or in the channel or sub-system adapter which supports the sub-system.

It is a further object of this invention to realize a channel or sub-system connecting unit which executes access protection on the basis of logical access protection data as in the case of the central processing unit (CPU), in such a data processing system which executes access protection for pages based on the logical access data corresponding to logical pages.

It is still further object of this invention to realize said dynamic address translation for attaining the abovementioned various purposes without continuously accessing the address conversion table from the channels or sub-system adapter and requiring less additional hardware at a high speed.

This invention, in order to attain the above purposes, comprises a dynamic address conversion system in the channel or sub-system adapter having the main memory store the address conversion table for converting the logical address into the physical address as well as being used in common with the central processing unit;

a register for storing a copy of each entry within the address conversion table in the main memory and the bit for indicating the validity of each such copy is provided; thus, when the central processing unit has issued an instruction for updating the entry within said address conversion table or an instruction commanding alteration of said entry is issued, the bit indicating validity of said register is displayed as the invalid bit;

a counter means for indicating the address in the memory data unit corresponding to each entry is provided, and when the data transfer request is generated from the input/output device or sub-system to be connected to said channel or sub-system adapter, access is made to said address translation table, the contents of one entry, included in said address translation table is copied by said register and access is made to the main memory on the basis of the contents of said register only when:

(1) it is the time of starting of the data transfer,
(2) the memory address for accessing the main memory reaches the boundary limit of said memory data,
(3) the bit indicating validity of said register entry is displayed as an invalid bit;

and in other cases, there is no accessing to said address conversion table, but rather to the main memory utilizing the address generated from said register and said counter means.

The present invention will be described in detail hereunder by referring to the attached drawings.

DESCRIPTION OF THE PREFERRED EMBODIMENTS

Figure 1:
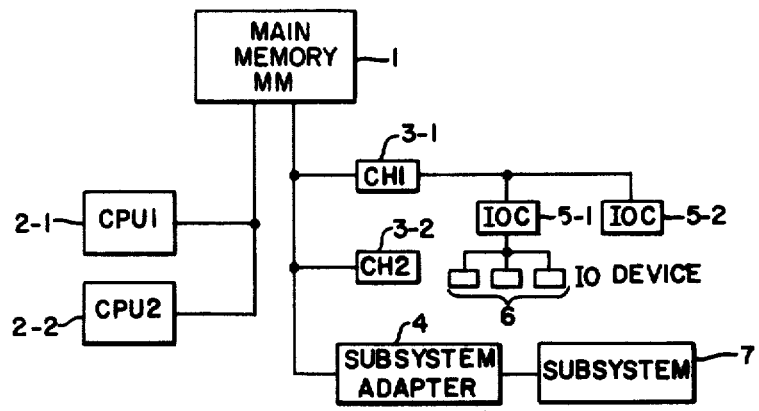
FIG. 1 is a system configuration of an embodiment adopting the present invention.

In FIG. 1, numeral 1 is the main memory (MM); 2-1 and 2-2, are each central processing units (CPU's); 3-1 and 3-2, channels; 4, sub-system adapter; 5-1 and 5-2, input/output control unit (IOC); 6 input/output device (IO) and 7, sub-system.

Figure 2:
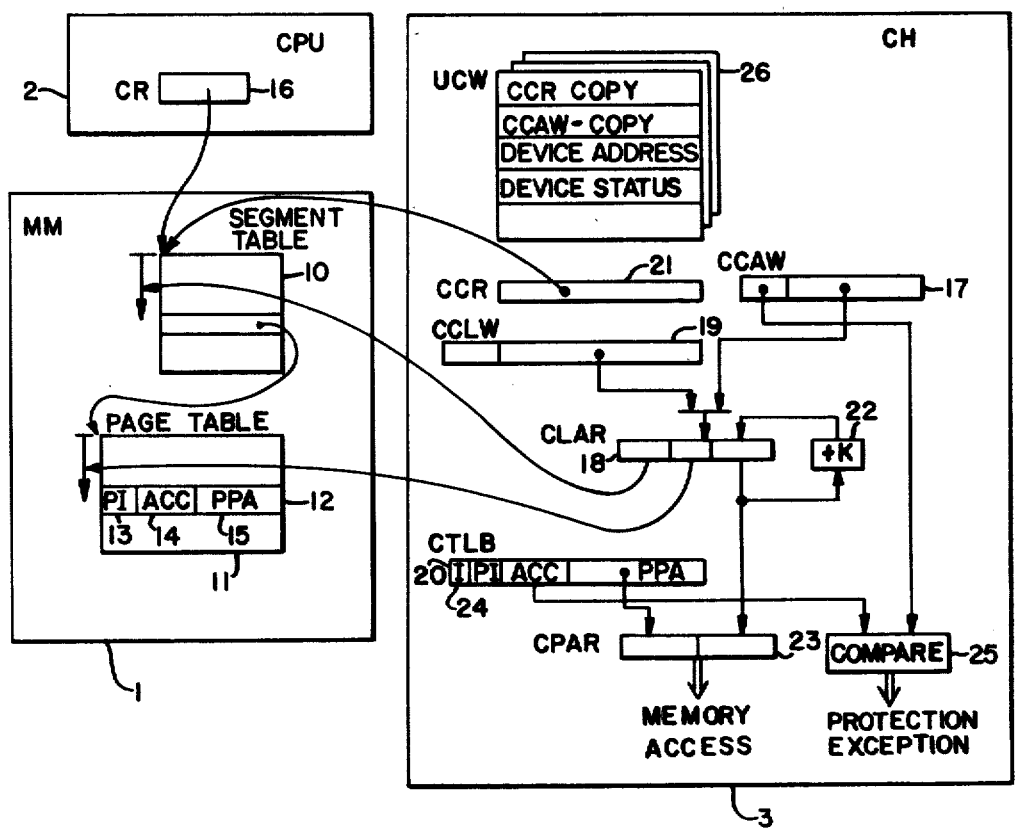
FIG. 2 shows the portion of an embodiment related to the dynamic address conversion function and located between the main memory 1, central processing unit 2 and channel 3.

In FIG. 2, numeral 1 is the main memory (MM); 2, central processing unit (CPU); 3, channel (CH); 10, segment table; 11, page table; 12, page table entry; 13, page invalid bit (PI); 14, access protection data (ACC); 15, physical page address (PPA); 16, control register (CR); 17, CCW address storage register (CCAW); 18, main memory logical address storage register (CLAR); 19, CCW storage register (CCCW); 20, page table entry data storage register (CTLB); 21, control register within the channel (CCR); 22, counter; 23, main memory physical address storage register (CPAR); 24, invalid bit (I); 25, comparator circuit; and 26, unit control word (UCW) memory.

The main memory 1 comprises a segment table 10 and page table 11 which are used for dynamic address translation by the central processing unit (CPU) 2. The page table entry 12 within the page table comprises a page invalid bit (PI) 13 which indicates the validity of the relevant page table entry, access protection data (ACC) 14 of the logical page corresponding to such page table entry, and physical page address (PPA) in which the relevant page exists. In each central processing unit (CPU) 2, the control register (CR) 16 indicates the present heading address of the segment table 10 corresponding to the space under execution at this time. Each channel comprises a CCW address storage register (CCAW) 17 which stores the logical address and channel access key of channel control word (CCW) now under execution, a main memory logical address storage register (CLAR) 18 which stores the main memory address (logical address) under execution, a CCW storage register (CCLW) 19 which stores the channel control word CCW under execution, a page table entry data storage register (CTLB) 20 which stores a copy of the page table entry corresponding to the logical page to which an access is being made and an invalid bit (I bit) corresponding to the copy, and a control register (CCR) 21 which stores the heading address of the segment table corresponding to the space to which an access is being made. The main memory logical address storage register (CLAR) 18 within each channel (CH) 3 is composed of a logical page address part and an address part in the page, and contents of the address in the page can be altered by means of the counter 22. An access to the main memory from each channel (CH) is performed by means of the main memory physical address storage register (CPAR) 23 which always holds the information necessary to correlate the physical page address (PPA) in the page table entry data storage register (CTLB) 20 with the in-page address in the main memory logical address storage register (CLAR) 18. An invalid bit (I) 24 in the page table entry data storage register (CTLB) 20 is set to "1" simultaneously with the issuance of the PURGE TLB instruction by the central processing unit (CPU) 2. Moreover, each channel (CH) 3 is provided with a comparator circuit 25 which compares the access protection data (ACC) in the page table entry data storage register (CTLB) 20 with the channel access key in the CCW address storage register (CCAW) 17. In addition, each channel (CH) 3 is also provided with various additional circuits. For example, each channel contains a unit control word (UCW) storage area (sub-channel) 26 which holds the executable condition of channel programs, as in the case of the existing channel.

The dynamic address translating operation in each channel is performed as explained below. The central processing unit (CPU) 12 sets, at first, the heading address of the channel program and the channel access key to the channel address word (CAW) (not illustrated) when an I/O request is first issued and then issues an SIO instruction. The channel (CH) 3 designated in the operand of the SIO instruction sets the channel address word (CAW) and content of control register (CR) 16 to the CCW address storage register (CCAW) 17 and control register (CCR) 21 within the channel, thereby enabling an access to the segment table entry made on the basis of the address which can be obtained from both the heading address of the segment table designated by the control register (CCR) 21 in the channel and the channel program heading address in the main memory logical address storage register (CLAR) 18. Then, an access is made to the page table entry on the basis of the address which can be obtained from the page address of the page table heading address included in this entry and the channel program heading address in the main memory logical address storage register (CLAR) 18, and thereafter the content is copied by the page table entry data storage register (CTLB) 20 in the channel (CH) 3, making "0" the invalid bit (I) 24 in the page table entry data storage register (CTLB) 20. The above process is referred to as the dynamic address translation (DAT).

The channel correlates the physical page address in the page table entry data storage register (CTLB) 20 with the in-page address in the main memory logical address storage register (CLAR) 18, generates the real address for the main memory (MM) 1 in the main memory physical address storage register (CPAR) 23, initiates an access to the main memory (MM) 1 and then fetches the channel control word (CCW). The channel (CH) 3 decodes this channel control word (CCW) and starts an input/output device (I). In case the execution of this channel control word (CCW) is accompanied by an access to the main memory, the channel (CH) 3 sets the logical address in the channel control word (CCW) equal to the contents of the main memory logical address storage register (CLAR) 18 for the dynamic address translation (DAT) as in the case above, and then sets the physical address equal to the contents of the main memory physical address storage register (CPAR) 23.

When the execution of a channel control word (CCW) includes an access to the main memory area composed of several continuous bytes, if an address is first entered in the main memory physical address storage register (CPAR) 23, the channel (CH) 3 initiates an access to the main memory, until the conditions listed below are generated. The access to the main memory is in accordance with a physical address generated only by the physical page address in the page table entry data storage register (CTLB) 20 and the in-page address in the main memory logical address storage register (CLAR) 18 which has been counted up by means of the counter 22. Conditions:

(1) Overflow has occurred in the in-page address as a result of the counting up operation performed in the in-page address part in the main memory logical address storage register (CLAR) 18.
(2) The invalid bit (I) 24 in the page table entry data storage register (CTLB) 20 is "1".

In case above conditions are set up, the channel (CH) 3 carries out the aforementioned dynamic address translation (DAT) and initiates an access to the main memory (MM) 1 by searching a physical address in the main memory physical address storage register (CPAR) 23.

Thereafter, the channel (CH) 3 executes sequentially the channel control word (CCW) in the channel programs as in the case of existing channels, and each time the execution start step for a new channel control word is accompanied by an access to the main memory, the aforementioned operations are repeated each time.

In addition, when the contents of the page table entry data storage register (CTLB) 20 is rewritten by the dynamic address translation (DAT), a check is always conducted of the page invalid bit (PI) and access protection data (ACC). When the page invalid bit (PI) is "1", the channel generates the page fault exception. When the result of the comparison between the access protection data (ACC) and channel access key in the CCW address storage register (CCAW) 17 indicates an access inhibit, the comparator circuit 25 generates the protection exception.

When these exceptions are generated, the channel (CH) 3 transmits an interrupt signal to the central processing unit (CPU) 2 and issues a command for ceasing operations to the input/output device (IO) in order to stop the execution of channel programs.

Figure 3:
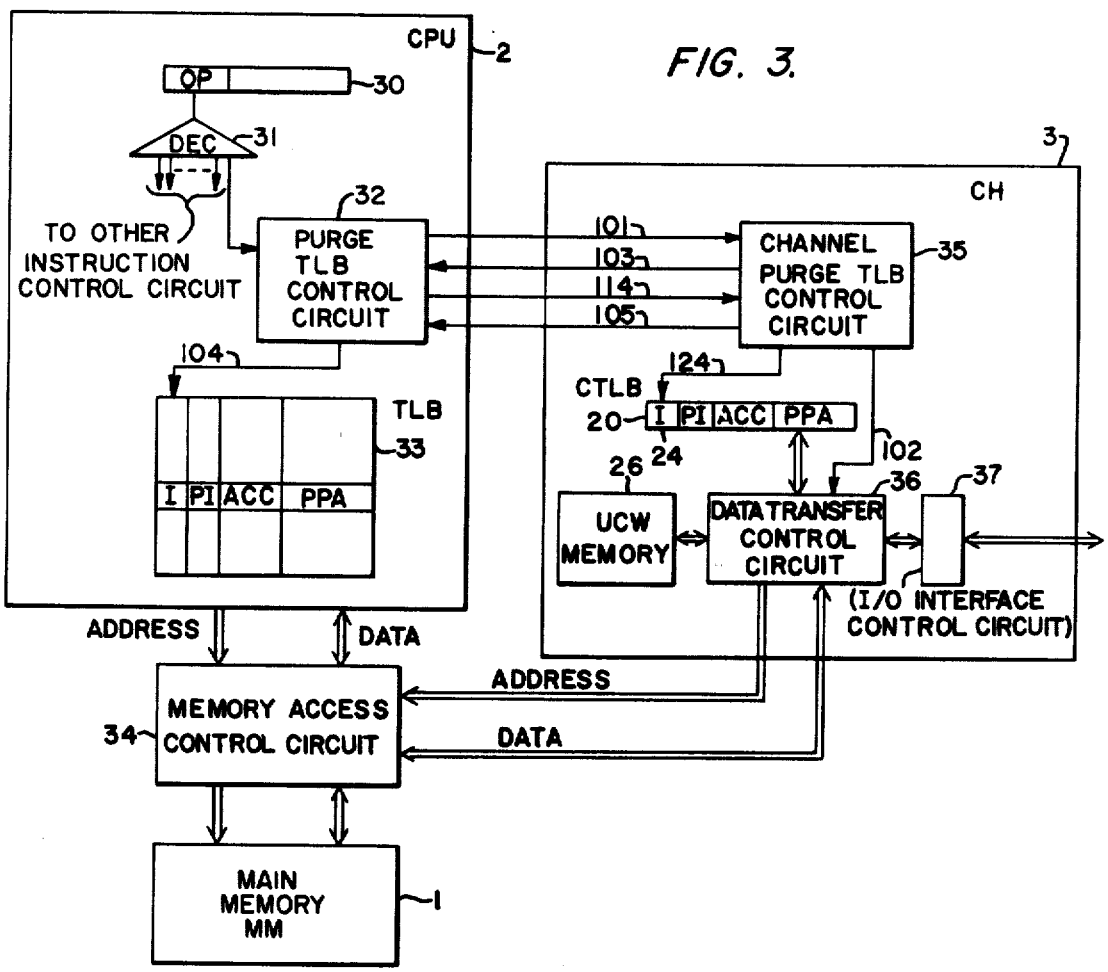
FIG. 3 illustrates a portion of the system and is provided to explain the operation of the PURGE TLB instruction.

Explained below is a procedure for setting the invalid bit (I) in the page table entry data storage register (CTLB) 20 to "1" by means of the PURGE TLB instruction. FIG. 3 shows an embodiment of the circuit directly related to the PURGE TLB instruction in the central processing unit (CPU) and the channel (CH). IN FIG. 3, numeral 1 represents the main memory (MM); 2, central processing unit (CPU); 3 channel (CH); 20, page table entry data storage register (CTLB); 24, invalid bit (I); 26, unit control word memory (UCW) 30, instruction register; 31, decoder (DEC); 32 PURGE TLB instruction control circuit; 33, table conversion index buffer (TLB); 34, memory access control circuit; 35, channel PURGE TLB control circuit; 36, data transfer control circuit; 37, I/O interface control circuit. The PURGE TLB instruction is an instruction to be used for the updating of an entry in the address translation table or an alteration of said entry. The operations performed in accordance with such an instruction will be explained on the basis of FIG. 3.

The central processing unit (CPU) 2 decodes the instruction code (OP) in the instruction register 30 in the decoder (DEC) 31 and starts the PURGE TLB instruction control circuit 32 when the PURGE TLB instruction is issued. The PURGE TLB instruction control circuit 32 transmits a PURGE TLB instruction signal to the channel (CH) 3 via path 101.

The channel PURGE TLB control circuit 35, upon receiving the PURGE TLB instruction signal, sends an interruption command signal to the data transfer control circuit via path 102 when the channel is in the data transfer condition, in order to interrupt the data transfer at the most desirable step. Then, the channel PURGE TLB control circuit 35 transmits a signal via path 103 to te PURGE TLB instruction control circuit 32 of the central processing unit (CPU) 2 indicating the interruption of the data transfer. Thus, the PURGE TLB instruction control circuit 32 sets via path 104 the invalid bit (I) in every entry of the table conversion index buffer (TLB) 33 in the central processing unit (CPU) 2 to "1" and then transmits an instruction via path 114 to channel (CH) 3 to set the invalid bit (I) 24 of the page table entry data storage register (CTLB) 20 to "1". This causes the channel PURGE TLB control circuit 35 to transmit a signal via path 124 to set the invalid bit (I) 24 in the page table entry dat storage register (CTLB) 20 to "1". The channel PURGE TLB control circuit 35 then transmits a signal via path 105 to the central processing unit (CPU) 2 to indicate that invalidation of the page table entry data storage register (CTLB) 20 has completed. Execution of the PURGE TLB instruction is thus completed.

Figure 4:
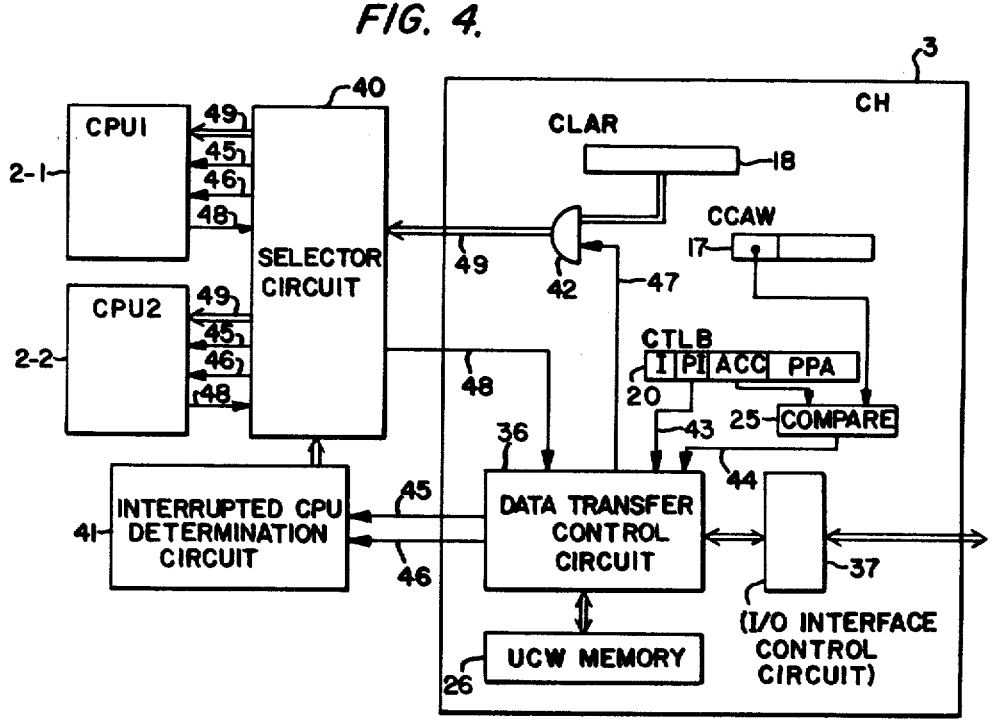
FIG. 4 illustrates a portion of the system related to the Page Fault Exception and Protection Exception features of the present invention.

Explained below is the procedure for informing the central processing unit (CPU) and input/output device of the page fault exception and protection exception. FIG. 4 shows an embodiment of the circuit directly related to the page fault exception and protection exception in the channels. In FIG. 4, 2-1 and 2-2 represent the central processing unit (CPU); 3, channel (CH); 18, main memory logical address storage register (CLAR); 20, page table entry data storage register (CTLB); 25, comparator circuit; 26, unit control word (UCW) memory; 36, data transfer control circuit; 37, I/O interface control circuit; 40, selector circuit; 41, interrupted CPU determination circuit; 42, page fault address send gate; 43, page fault detecting line; 44, protection exception detecting line; 45, page fault interruption request line; 46, protection exception interruption request line; 47, page fault address send designation signal line; 48, interruption end informing line; and 49, page fault address line.

As illustrated in FIG. 4, the fact that the page invalid bit (PI) in the page table entry data storage register (CTLB) 20 is "1" is transmitted to the data transfer control circuit 36 by means of the page fault detecting line 43. The data transfer control circuit 36 transmits to the interrupted CPU determination circuit, via the page fault interruption request line 45, a signal indicating that there is a page fault interruption request. The interrupted CPU determination circuit 41 determines which CPU is to be interrupted as in the case of a channel cross-call and indicates the data route in the selector circuit 40. The data transfer control circuit 36 issues an interruption request and simultaneously opens the page fault address send gate 42 via the page address send designation signal line 47 thereby transfering the fault address sent from the main memory logical address storage register (CLAR) 18 to the page fault address line 49. Thus, the page fault interruption request and page fault address to the designated central processing unit (CPU) are transmitted from the channel (CH) 3 via the page fault interruption request line 45 and page fault address line 49. The central processing unit (CPU) performs operations similar to those performed when a page fault is generated in the central processing unit (CPU) in order to generate conversion exceptions and simultaneously stores the address wherein a page fault is generated in the channel in the fixed address of a predetermined area of the central processing unit (CPU). The predetermined storage area in the central processing unit (CPU) may be the same as that used for storage of conversion exception addresses. The data transfer control circuit 36 in the channel (CH) 3 issues an interruption request to a central processing unit and simultaneously requests the I/O interface control circuit 37 to execute the completion sequence designated by the channel. The I/O interface control circuit 37 provides such a completion sequence as in the case where an error is generated during the transmission of data on the I/O interface during the memory access procedure from the channel. When an interruption end signal is returned from the central processing unit (CPU) 2 via the interruption end signal line 48 and when a completion sequence end signal is sent from the I/O interface control circuit 37, the data transfer control circuit 36 completes a page fault processing cycle.

The operation of transmitting a protection exception signal to the central processing unit (CPU) and input/output device is conducted as explained below. As illustrated in FIG. 4, the protection exception signal is transmitted to the data transfer control circuit 36 via the protection exception detecting line 44 extending from the comparator circuit 25. The data transfer control circuit 36 informs the interrupted CPU determination circuit of the existence of the protection exception interruption request using the protection exception interruption request line 46. The interrupted CPU determination circuit 41 determines the CPU for interruption as in the case of the page fault interruption and then indicates the data route in the selector circuit 40. Thereby, the protection exception interruption request is transmitted to the appropriate central processing unit (CPU) designated by the channel (CH) 3 via the protection exception interruption request line 46. In contradistinction to the page fault interruption, no address is transmitted. The data transfer control circuit 36 transmits the interruption request to the central processing unit and simultaneously requests the I/O interface control circuit 37 to execute the completion sequence designated by the channel.

The I/O interface control circuit 37 executes the completion sequence which is similar to the sequence executed when an error is generated on the I/O interface during the memory access procedure from the channel. Thus, when the interruption end signal is returned from the central processing unit (CPU) 2 via the interruption end signal line 48 and when the completion sequence end signal is sent from the I/O interface control circuit 37, the data transfer control circuit 36 completes a series of protection exception processes.

In the above explanation, the channel is taken as an example of a unit which uses the main memory in common with the central processing unit and performs dynamic address translation. However, this invention is not limited to such a channel and it is apparent that the present invention can be adopted to such a unit as the sub-system adapter shown in FIG. 1. In such a case, the sub-system corresponds to an input/output device.

For the I/O device or sub-system which does not substantially require page fixing, this invention is advantageous in that a channel or sub-system connection unit can be fabricated so as to operate at a high speed with less hardware, and not cause the following problems:

(1) an overhead due to the processing required for searching a page to be fixed prior to the execution of the channel programs;
(2) when starting a number of I/O devices, the number of fixed pages increases and the capacity of the real memory becomes insufficient.

Moreover this invention has an additional advantage in that page fixing can be executed only within the range of the software used not only for the I/O device, which does not require page fixing, but also for the channels which require page fixing. This enables the elimination of the channel invalid bit in the page table entry, required in presently used prior art systems. Thus, the overhead for the software processing required for the operation of the channel invalid bit can be eliminated.

Moreover, application of this invention to a channel or sub-system adapter of the data processing system wherein the logical access protection data related to the page corresponding to an entry enables such entry of the address translation table and allows the establishment of a data processing system which eliminates the problem occurring when the channel recognizes the logical address for the address as in existing prior art systems but must recognize a physical key for access protection.

Furthermore, according to this invention high speed access is possible and less hardware is required for dynamic address translation since it is not necessary to access the address translation table every time that an access is made to the main memory from the channel or sub-system adapter.

What is claimed is:

1. A data processing system comprising:
   a main memory for storing an address translation table;
   a central processing unit operatively connected to said main memory;
   a plurality of channels or sub-system adapters operatively connected to said main memory and said central processing unit, each of said plurality of channels or sub-system adapters including main memory accessing means for accessing said main memory and for providing a physical page address to the respective channel or sub-system adapter by utilizing said main memory and said central processing unit to translate a logical page address to the physical page address, each said main memory accessing means comprising:
   a register having areas for storing a copy of at least one entry within said address translation table in said main memory and a validity bit indicative of the validity of said copy, said copy including the physical page address;
   storage register means for storing the logical page address and an address in the page, said storage register means including a counter for indicating respective addresses in the page corresponding to said at least one entry within said address translation table by incrementing said address in the page;
   first means, operatively connected to said register and said counter, for accessing said main memory in accordance with a physical address comprising said copy, including the physical page address, and one of said respective addresses in the page; and
   second means, operatively connected to said central processing unit, for altering the state of said storage area containing said validity bit when said central processing unit has issued an instruction for updating said at least one entry within said address translation table or an instruction indicating alteration of said at least one entry, so that said validity bit is indicative of an invalid entry copy.

2. A data processing system as set forth in claim 1, wherein each said main memory accessing means further comprises:
   third means operatively connected to said central processing unit, said register and said storage register means, including means for accessing said at least one entry in said address translation table in accordance with the logical page address stored in said storage register means, and means for copying the content of said at least one entry in said address translation table into said register when a data transfer request signal is generated by an input/output device or sub-system connected to the respective channel or sub-system adapter, and when one of the following three conditions are met:
   condition 1: a data transfer is being initiated;
   condition 2: the physical address for accessing said main memory is outside the bounds of said page;
   condition 3: the validity bit stored in said register is indicative of an invalid entry copy; said first means accessing said main memory, instead of said address translation table, using the physical address provided by said register and said counter, when a data transfer request signal is generated by an input/output device or sub-system connected to the respective channel or sub-system adapter and when none of said conditions 1-3 are met.

3. A data processing system as set forth in claim 1, wherein each of said plurality of channels or sub-system adapters further comprises means for generating an invalid signal when said validity bit corresponding to said copy of said at least one entry indicates an invalid entry copy, and means for transmitting said invalid signal to said central processing unit to inform said central procesing unit that the validity bit is indicative of an invalid entry copy.

4. A data processing system as set forth in claim 1, wherein said copy of said at least one entry stored within said register includes access protection data, each of said plurality of channels or sub-system adapters further comprising:

means for storing an access key;

means, operatively connected to said register and said means for storing the access key, for comparing the access protection data with the access key stored in the respective channel or sub-system adapter; and means, connected to said comparing means, for generating a non-access signal when the comparison result obtained by said comparing means indicates impossibility of access, and for transmitting said non-access signal to said central processing unit.

* * * * *

UNITED STATES PATENT AND TRADEMARK OFFICE
CERTIFICATE OF CORRECTION

PATENT NO. : 4,373,179
DATED : FEBRUARY 8, 1983
INVENTOR(S) : YUTAKA KATSUMATA

It is certified that error appears in the above-identified patent and that said Letters Patent is hereby corrected as shown below:

```
Col. 1, line 65, after "still" insert --a--.
Col. 3, line 60, "12" should be --2--.
Col. 4, line 27, "(I)" should be --(IO)--.
Col. 5, line 20, "IN" should be --In--;
        line 60, "dat" should be --data--.
Col. 9, line 15, "procesing" should be --processing--.
```

Signed and Sealed this

Twenty-eighth Day of June 1983

[SEAL]

Attest:

GERALD J. MOSSINGHOFF

Attesting Officer

Commissioner of Patents and Trademarks